Oct. 23, 1962 J. W. LUCAS 3,059,529
PORTABLE PROJECTION ADAPTER
Filed May 21, 1957 2 Sheets-Sheet 2

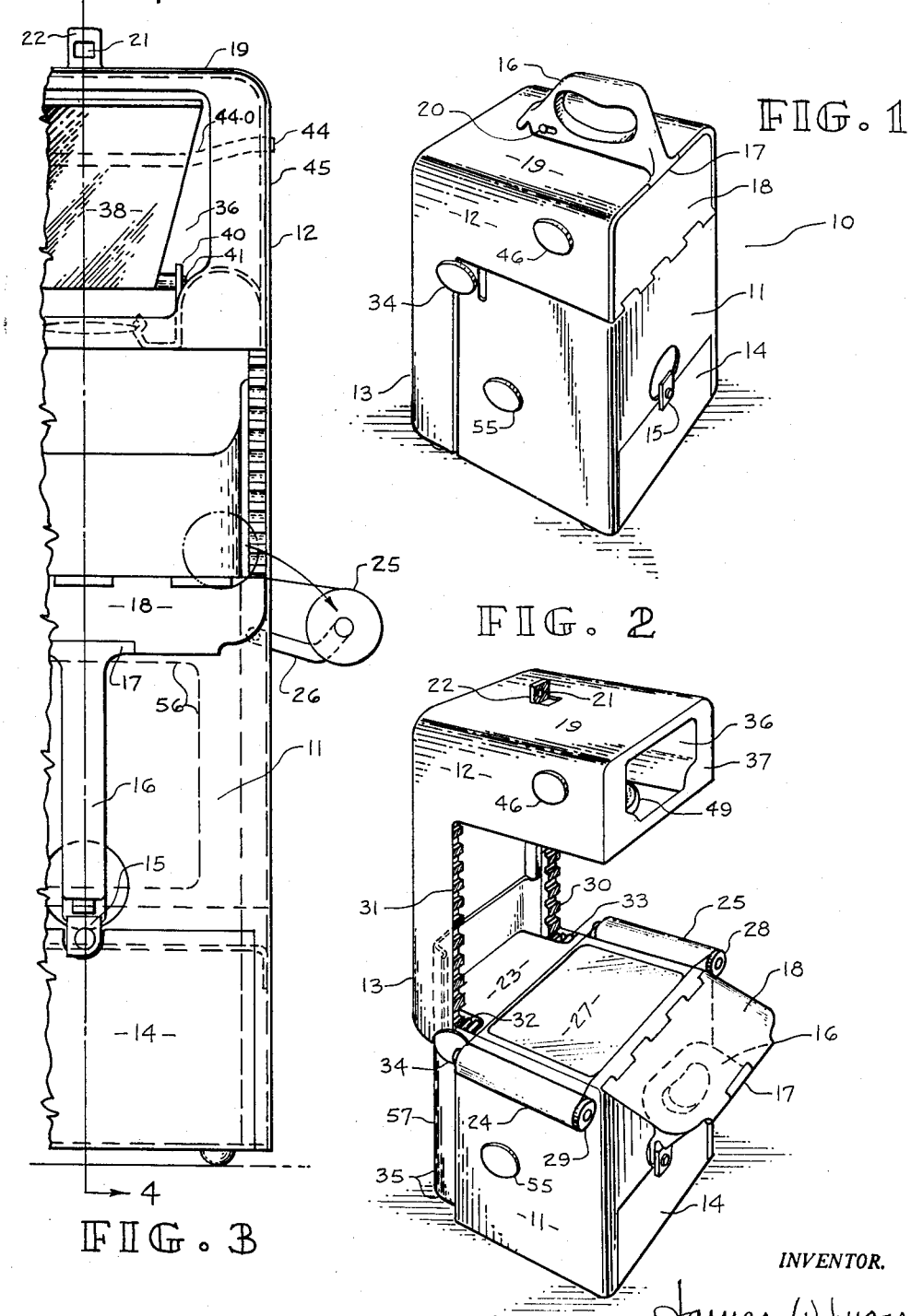

INVENTOR.
James W. Lucas

3,059,529
Patented Oct. 23, 1962

3,059,529
PORTABLE PROJECTION ADAPTER
James W. Lucas, 2613 Wilshire Blvd.,
Santa Monica, Calif.
Filed May 21, 1957, Ser. No. 660,643
6 Claims. (Cl. 88—24)

This invention relates to devices for projecting a plurality of pictorial images, and more particularly to a device being adapted to add pictorial material of various kinds to still or motion picture images while they are being projected.

Actually, the device of my invention might be better classified as a re-projecting device since, in the functional sense, it is not a complete projector. It does not have a light source and associated condensing system, nor does it have an intermittent movement and shutter for motion picture film, nor holders for transparent slides or opaque material normally included in conventional projectors of various kinds.

Instead it is an adapter which is placed in the light beam of any conventional projector and receives the projected images therefrom on an established focal plane at which the additional pictorial material is added. Then, with its own objective optical system, the device projects on the screen the composite image formed at the focal plane including the pictures projected by the conventional projector.

Except for the projection device described in my copending application filed November 1, 1955, under the title, "Visual Aid Projection Adapter" and bearing the Serial Number 544,301, now U.S. Patent No. 2,859,660, of which the present invention is a substantially different embodiment, no projection equipment of this general character is presently available in the photographic industry. From the functional standpoint, the nearest approach to the devices of my invention is a type of projector which makes it possible merely to add secondary pictorial material to primary images originating in the same projector. The pictorial originals used in this latter type of projector must be prepared in the form of transparent slides of the particular size to fit the relatively large projection apertures. The secondary material is simply superposed over the upper surfaces of the large slides. This limitation precludes the use of presently available motion picture films, color slides and filmstrips, and it was with the foregoing important considerations in mind that my invention has been made.

One important object of my invention is the provision of a device being adapted for adding secondary pictorial material to any presently available motion pictures or photographic originals while they are being projected.

Another important object of my invention is the provision of a device of the character described and being adapted to receive the image-bearing light beam of a conventional projector while the light beam is being projected substantially in the direction of the screen.

A further important object of my invention is the provision of a device of the character described being light in weight, foldable into a self-formed carrying case of minimal dimensions, and being relatively low in cost.

An additional object of my invention is the provision of a device of the character described being adapted with storage and carrying space for accessory equipment and image-forming materials.

In brief, the device of my invention includes a box-like main body portion having a picture receiving aperture in the back and an image forming aperture fitted with a condensing fresnel in the top thereof, and a reflecting surface diagonally disposed between the two apertures. A lens hood is disposed above the top of the main body and is provided with a projection lens and a reflecting surface adjacent thereto to receive the image formed at the plane of the fresnel and direct it onto the screen.

A rigid cover glass is provided over the fresnel and spools of pliofilm or other transparent material are provided with crank means by which the transparent material may be moved across the cover glass. A vertical support member which is movable upwardly above the top of the main body holds the lens hood assembly at any point upwardly of the cover glass and serves to cover both the top and the rear apertures when lowered into juxtaposition with the top of the main body, and a handle member is adapted to swing upwardly to engage the top of the hood assembly and lock the two interfitting sections of the device in the closed position in which they combine to form a smooth-sided rectangular case.

Certain variations in the embodiment shown and additional objects of this invention will become apparent to persons familiar with the general art upon examination of the following detail specification and the references contained therein to the accompanying drawings, in which:

FIGURE 1 is a perspective view of a portable projection adapter device constructed according to my invention and shown as it appears when closed;

FIGURE 2 is a perspective diagrammatic view similar to that of FIGURE 1 showing the device in the open position ready for use;

FIGURE 3 is an elevational view showing a vertical half section of the front of the device;

Figure 5:
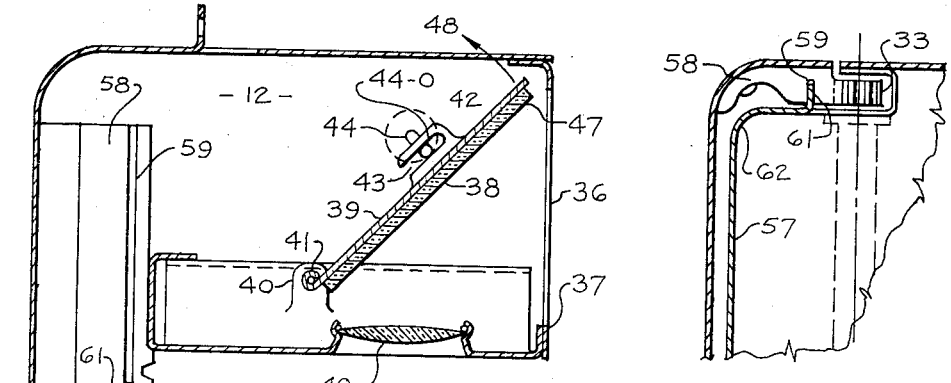
Figure 4:
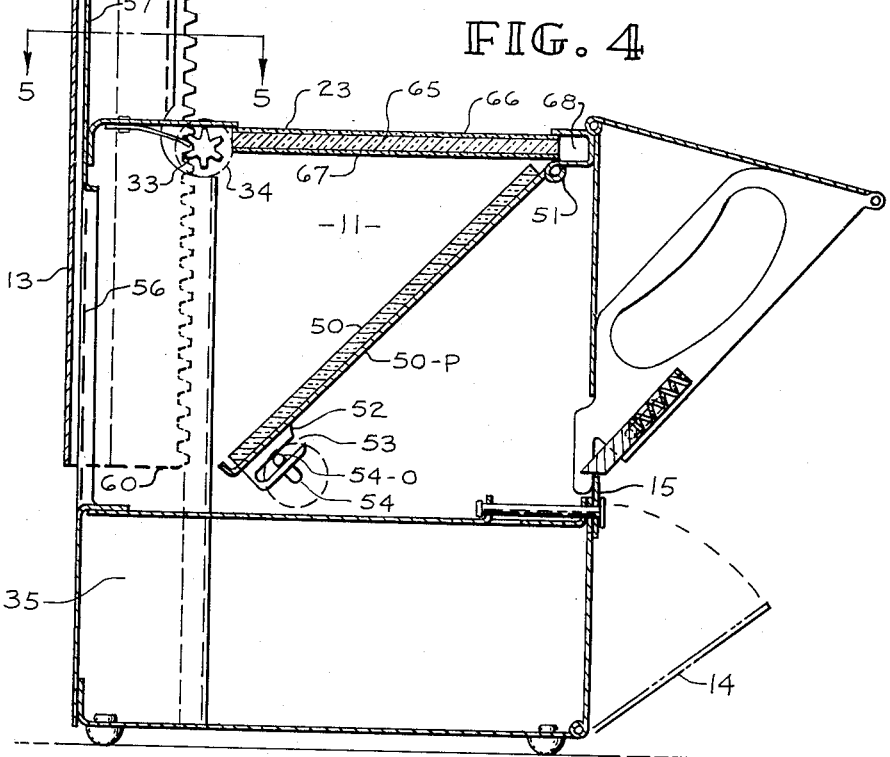
FIGURE 4 is a sectional side view taken vertically of the device along the line and in the direction indicated by the arrows 4—4 in FIGURE 3, showing the positioning of the various functional elements therein.
Figure 6:
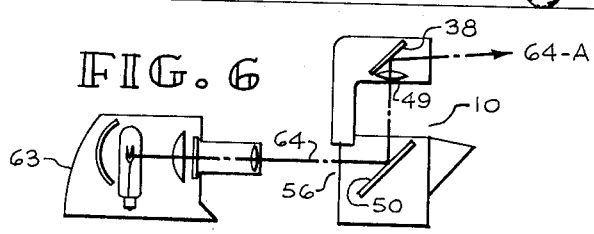

FIGURE 5 is a sectional view taken along the line and in the direction indicated by the arrows 5—5 in FIGURE 4, and showing the arrangement of interfitting movable parts of the vertical support member and the main body, and FIGURE 6 is a purely schematic diagram showing the manner in which the adapter device cooperates with a conventional projector to form a composite image and project it onto a screen.

Reference is again made to the perspective view of FIGURE 1 which shows a portable projection adapter 10 constructed in accordance with my invention in which it is seen to include a generally square box-like main body section 11 and a hood assembly 12 having sides aligning with those of the main body 11 and being extended downwardly at one end 13 and adapted to telescope over and completely enclose the back of the body 11.

In the frontal surface of the main body 11 a hinged door 14 provides access to a storage space in the base of the device, the door 14 being held in the closed position by a latch 15 when the device is being carried or transported. A handle member 16 is hingedly attached at one end 17 to the outwardly extended edge of a panel 18 which, in turn, is hinged to the upper frontal edge of the body 11. In FIGURE 1 the hinged panel 18 is shown positioned against the frontal surface of the head 12, and the handle 16 is disposed on the top of the hood assembly 12 where it is held securely by a thumb-operated slide bolt 20 which is engageable within the aperture 21 in the vertical bracket 22 extending upwardly from the hood top 19, as can be better seen in FIGURE 2.

In the perspective view of FIGURE 2, the device is seen with its hood assembly 12 extended upwardly relative to the body 11, and the handle 16 has been disengaged from the bracket 22 in the upper surface 19 of the hood 12, and folded under the hinged panel 18 thereby supporting the latter forwardly and outwardly from the top 23 of the main body 11, and two rolls 24 and 25 of transparent material such as pliofilm which are pivotally attached to the sides of the body case by angle arms such as 26 seen in the vertical elevation of FIGURE 3, are rotated outwardly of the main body on opposite sides thereof so that the transparent material 27 between the two spools is disposed across the upper surface of the top 23 of the main body 11. Rotation of one of the thumb screws 28 or 29 serves to move the transparent material from one spool to another.

A pair of rack members 30 and 31, best seen in FIGURE 2, are disposed along the inner edges of the downward extension 13 of the hood 12, and are engaged by the gears 32 and 33 respectively, and upon rotation of the thumb screw 34 cooperate to move the hood member 12 upwardly or downwardly relative to the main body 11.

As is clearly shown in FIGURE 2, the main body 11 is inset vertically at each side as indicated at 35, thereby providing spaces in which the rack members 30 and 31 and the sides of the panel extension 13 adjacent thereto are received when the hood 12 is moved downwardly to the closed position as shown in FIGURE 1.

Further details of the interior arrangement of the device are seen in the schematic frontal elevation shown in half section in FIGURE 3 and in the side elevation of FIGURE 4.

The hood assembly 12 is seen in FIGURE 2 to have an aperture 36 in the frontal surface 37 thereof, and as best seen in FIGURE 4 a mirror 38 is angularly disposed by means of its attachment to a panel 39 which in turn is pivotally interfitted as shown at 41 to structural studs such as 40 in FIGURES 3 and 4, and is movably positionable upwardly thereof by means of a hook member 42 having a slot 43 in which the shaft 44 and its offset section 44–O is engageable.

As indicated in the half-section of FIGURE 3, the opposite ends of the offset shaft 44 are journalled in apertures in the sides, such as 45, of the hood 12, one of the ends being fitted with a thumb knob 46, seen in FIGURES 1 and 2, rotation of which turns the rod 44 and moves the offset portion 44–O thereof in the slot 43 of the hook 42, thereby swinging the outer end 47 of the mirror 38 rotatively relative to the pivot point 41 in the direction of the arrow 48, and thus changing its angular relationship with respect to the aperture 36 and to the projection lens 49 seen in FIGURES 2 and 4.

As is clearly shown in FIGURE 4, a second mirror 50 is attached to a panel 50–P interiorly of the main body 11, the panel 50–P being diagonally disposed and adjustably supported by means similar to those described previously in connection with the mirror 38 and panel 39. The panel 50–P, however, is pivotally attached at its upwardly disposed edge by means of outwardly extended stud members which are received in circular retaining straps depending from the body structure as indicated at 51. At its downwardly disposed edge the panel 50–P is fitted with a hook member 52 having a slot 53 therein adapted to receive the offset portion 54–O of a transverse rod 54 which is journalled at its opposite ends in apertures in the sidewalls of the main body portion 11, and provided with a thumb knob 55 disposed externally of the body 11 as shown in FIGURES 1 and 2.

As indicated by the broken lines at 56 in FIGURE 3, a generally square aperture is provided in the back wall 57 in FIGURE 2 of the main body section 11 which is open rearwardly when the downwardly extended section 13 of the hood assembly 12 is raised to the position shown in FIGURE 2 and is covered by the section 13 when the latter is lowered thereover to the position shown in FIGURE 1.

The manner in which the hood assembly 12 is rigidly positioned at any spacing above the main body 11 is clearly shown in FIGURE 4 and in the vertical section taken therefrom along the line and in the direction indicated by the arrows 5—5 and shown in FIGURE 5.

A structural member such as 58 is vertically disposed in opposite rearward corners of the hood assembly 12 and extends downwardly therein to the bottom of the downward extension 13 as indicated at 60 in FIGURE 4. The teeth of the rack member 30 extend outwardly from the forwardly disposed edge of the vertical member 58 adjacent a groove 59 which is disposed longitudinally therein and adapted to slidably receive the flange portion 61 which is bent outwardly adjacent the rounded corner 62 of the back 57 of the main body 11. Thus pressure from the spur gear 33 against the teeth of the rack 30 is effective to hold the flange 61 rigidly within the groove 59, and the lens 49 is constantly disposed in a plane precisely parallel to the image forming pictorial elements that may be disposed upon the upper surface 23 of the main body 11.

Operation of the device when used in conjunction with a projector of any kind having its own light source, is clearly illustrated in the schematic diagram of FIGURE 6. The projector 63 is positioned behind the adapter device 10 and projects its picture image and light beam 64 through the aperture 56 in the main body of the device 10 onto the mirror 50 from which it is reflected upwardly through a condensing fresnel 65 which is maintained in a horizontal plane between the aperture plate 66 and the underglass 67 which are held in close juxtaposition by the channelled front and sides of the top 23 of the main body 11.

Continuing upwardly, the light beam 64 passes through any transparent image-bearing medium, such as film transparencies, glass slides, or the pliofilm 27 seen in FIGURE 2, and combines the images thereon with those originating in the projector 63. Thus the lens 49 receives the combined image and projects it onto the surface of the mirror 38 from which it is directed outwardly as indicated by the arrow 64–A onto a viewing screen.

Attention should be directed to a unique and particularly significant structural feature of the device of my invention. As will be seen in FIGURE 4, the projection lens 49 is installed in a fixed position within the hood. Contrary to conventional practice it is not enclosed in a barrel mount having interfitting extension sections by means of which a lens is ordinarily moved, relative to the plane in which images are formed in the projector, in order to focus the image on the viewing screen.

Instead, in the device of my invention, the means for elevating the hood member above the aperture plate 66 in the top 23 of the main body serves also as the means for focusing the projected image on the viewing screen. As will be readily understood, this choice and arrangement of structural and functional elements simplifies the operation of the device and makes possible substantial economies in manufacturing costs.

Although in order to comply with the statute the present invention has been described and illustrated in considerable detail in the form of a single embodiment, it will be understood that these details are subject to change and the embodiment is likewise subject to substantial variation, and the invention itself is amendable to adaptation into a plurality of embodiments and therefore is not to be limited to the form shown herein nor restricted in any manner except as may be indicated by the extent of the following claims.

What I claim is:

1. A portable self-enclosing projection adapter for adding pictorial material to still or motion picture images while they are being projected, comprising: a main body defining a cubical closure having in its rear wall a posterior aperture through which the light beam from a projector is directed, and having in its top surface a second aperture with a transparent aperture plate, onto which the projected image is focused, affixed to said top in the plane of said second aperture; a transparent supporting plate disposed adjacent the under surface of said aperture plate, and a fresnel-type condensing lens interposed therebetween; a reflecting surface diagonally disposed interiorly of said main body so as to direct images projected through said posterior aperture onto said aperture plate; a hood member, sectionally conformed in the manner of an inverted L, the horizontal portion thereof fitting over the top of said main body, and the vertical portion being juxtaposed against the back of said main body and slidably attached thereto; a frontal aperture disposed in the vertical surface of said horizontal portion of said hood, parallel to and spaced from said vertical hood portion; a projection lens disposed in said hood and a reflecting surface adjacent said lens effective to direct images formed in space in the plane of said aperture plate through said frontal aperture and upon a viewing screen, a pair of rack members disposed vertically in opposite rearward corners of said vertical portion of said hood member; a pair of spur gears affixed to a common shaft, said shaft being journalled in said main body whereby said gears are rotatably engageable in said rack members; knob means disposed exteriorly of said main body for rotating said shaft, and track means including interfitting channel sections affixed to said main body and said hood effective to hold said hod in parallel relationship to said main body as said hood is elevated by said rack means.

2. The invention in accordance with claim 1 in which said track means comprises: a vertical groove disposed longitudinally in the inwardly facing surfaces of each of said rack members, said grooves being adapted to receive longitudinal flanged lip sections disposed oppositely outwardly from the sides of said main body and being effective to maintain the vertical alinement of said vertical portion of said hood and said main body when said hood assembly is elevated sufficiently to raise said vertical portion thereof above said posterior aperture in said main body.

3. The combination comprising: a generally conventional projector device for projecting pictorial images upon a viewing screen and a projection adapter in accordance with claim 2, said projector being positioned relative to said adapter so as to cast its image-bearing light beam through said posterior aperture in said main body and onto said diagonally disposed reflecting surface whereby said projected image of said projector is centered and focused upon the plane of said aperture plate, and any image bearing transparent overlays disposed thereon, and the combined images from said projector light beam and said overlays are focused on a viewing screen by vertical spacing of said hood member above said aperture plate.

4. The combination as set forth in claim 3 and being further characterized by a pair of spools disposed laterally of said light passing aperture, said spools being adapted to receive thereon a longitudinally extended image bearing band of transparent and generally flexible material such as pliofilm, and crank means for winding said band across said light passing aperture from either spool to the other, said projection adapter and said image bearing transparent band mounted on said spools being adapted to cooperate with said conventional projector in such a manner that any predetermined plurality of images disposed on said transparent band is combined with images on said transparent overlays and in said projector light beam, and all images are projected simultaneously upon a viewing screen.

5. In a portable, self-enclosing projection adapter for adding pictorial material to still or motion picture images while they are being projected, the combination of: a main body portion defining a cubical closure having a posterior aperture in the back and a second aperture in the top thereof and a transparent aperture plate affixed to said top in the plane of said second aperture; a fresnel-type condensing lens disposed between transparent supporting plates in said image-forming aperture; a reflecting surface being disposed diagonally relative to said posterior aperture and said aperture plate; a hood member being movably superposed over said top of said main body and having a vertical portion extended downwardly over the back of said main body so as to cover said posterior and second apertures in said back and top; a frontal aperture disposed centrally in the front vertical wall of said hood in parallel spaced relation to said vertical downwardly extended portion; a projection lens fixedly disposed in said hood, and reflecting means adjacent said lens effective to direct images from said image forming aperture through said lens and said frontal aperture and upon a viewing screen.

6. In a portable, self-enclosing projection adapter for adding pictorial material to still or motion picture images while they are being projected, the combination of: a main body portion defining a cubical closure having a posterior aperture in the back and a light-passing aperture plate in the top thereof; a fresnel-type condensing lens adjacent the under surface of said aperture plate; a reflecting surface interiorly of said main body diagonally disposed relative to said posterior aperture and said aperture plate; a hood assembly being movably superposed over said top of said main body and having a vertical portion extended downwardly over the back thereof so as to cover said aperture in said back and said aperture plate in said top; a frontal aperture centrally disposed in the forward vertical wall of said hood in parallel spaced relation to said vertical downwardly extended hood portion; a projection lens disposed in said hood, and reflecting means adjacent thereto effective to direct images from said aperture plate through said lens and said frontal aperture and upon a viewing screen; and rack and pinion means for spacing said hood assembly vertically relative to said main body and focusing said images on said screen.

References Cited in the file of this patent
UNITED STATES PATENTS

| 1,464,833 | Ringler | Aug. 14, 1923 |
| 2,227,342 | Gustowski | Dec. 31, 1940 |
| 2,246,853 | Martin | June 24, 1941 |
| 2,697,379 | Walker | Dec. 21, 1954 |
| 2,699,704 | Fitz Gerald | Jan. 18, 1955 |
| 2,754,722 | Howell et al. | July 17, 1956 |
| 2,767,611 | Fitz Gerald | Oct. 23, 1956 |
| 2,772,600 | Walker | Dec. 4, 1956 |
| 2,859,660 | Lucas | Nov. 11, 1958 |
| 2,863,356 | Goldberg | Dec. 9, 1958 |

FOREIGN PATENTS

| 8,185 | Great Britain | of 1892 |